(12) United States Patent
Washington

(10) Patent No.: US 12,380,734 B1
(45) Date of Patent: Aug. 5, 2025

(54) STEREOSCOPIC METHOD FOR HIGHLIGHTING THE VARIATION OF COLORS AND EYE COLOR ACCURACY

(71) Applicant: Malcolm L. Washington, Mattison, IL (US)

(72) Inventor: Malcolm L. Washington, Mattison, IL (US)

( * ) Notice: Subject to any disclaimer, the term of this patent is extended or adjusted under 35 U.S.C. 154(b) by 767 days.

(21) Appl. No.: 17/716,673

(22) Filed: Apr. 8, 2022

(51) Int. Cl.
| | | |
|---|---|---|
| *A61B 3/14* | (2006.01) | |
| *A61B 3/00* | (2006.01) | |
| *A61B 3/11* | (2006.01) | |
| *G02B 30/00* | (2020.01) | |
| *G02B 30/22* | (2020.01) | |
| *G03B 35/02* | (2021.01) | |
| *G06F 3/048* | (2013.01) | |
| *G06V 40/18* | (2022.01) | |
| *H04N 13/00* | (2018.01) | |

(52) U.S. Cl.
CPC ............. *G06V 40/18* (2022.01); *G02B 30/22* (2020.01); *G03B 35/02* (2013.01); *G06F 3/048* (2013.01); *H04N 2013/0074* (2013.01); *H04N 2213/008* (2013.01)

(58) Field of Classification Search
CPC ...... A61B 3/0025; A61B 3/0033; A61B 3/112; A61B 3/14; G02B 30/22; G03B 35/02; G06F 3/048
See application file for complete search history.

(56) References Cited

U.S. PATENT DOCUMENTS

| | | |
|---|---|---|
| H1506 H | 12/1995 | Beretta |
| 7,145,656 B2 | 12/2006 | Rodrigues et al. |
| 9,872,616 B2 | 1/2018 | Daneshi Kohan et al. |

*Primary Examiner* — Jack Dinh
(74) *Attorney, Agent, or Firm* — Donald J. Ersler

(57) ABSTRACT

The present invention is to introduce a computer-implemented, web-based stereoscopic acuity computation and stereo eye color accuracy assessment to test for what colors patients are deficient in as seen through the real world in pictures rather than just for color by itself. The pictures are taken with a camera or similar electronic device use. The eye color accuracy exam utilizes caffeine products. The computation takes color characteristics of a target color where they are inputted, identified matched, and processed in a way as to expose a visual deficiency of the target color selected from a color database and color chart based upon color characteristics of the target color to be matched, processed, and visually stereoscopically displayed thus enabling comparison of the alternate color(s) with the target color. The computation uses gamma correction, color thresholding, alpha composing, opacity ratios and eye color accuracy assessment from a patient to provide a result.

3 Claims, 3 Drawing Sheets

STEREOSCOPIC METHOD FOR HIGHLIGHTING THE VARIATION OF COLORS AND EYE COLOR ACCURACY

BACKGROUND OF THE INVENTION

1. Field of the Invention

The present invention relates to stereoscopic visualization and more specifically to a stereoscopic method for highlighting the variation of colors and eye color accuracy test, which utilizes a computer-implemented, web-based computation for what colors the eye as seen through real world image data of stereoscopic photographic subject matter rather than just for color itself.

2. Discussion of the Prior Art

This computational method is made to address color accuracy from the difference of variation of a similar color that is seen in the real world to image data from stereoscopic photographic subject matter seen by a subject using binocular vision and their ability to tell the difference among a specific color from a similar color rather than from some random colors seen on a piece of paper.

Accordingly, there is a clearly felt need in the art for a stereoscopic method for highlighting the variation of colors and eye color accuracy assessment/test, which utilizes a computer-implemented, web-based computation for what colors the eye as seen through real world image data of stereoscopic photographic subject matter rather than just for color itself by highlighting matching colors in relation to the field of ophthalmology with binocular vision.

SUMMARY OF THE INVENTION

The present invention is a computer-implemented, web-based graphical user interface stereoscopic visualization computation and eye color accuracy assessment using binocular vision to test for what colors patients are deficient as seen through the real world pictures rather than just for color by itself from electronic device use, caffeine use, or any chemical/biological agents that may affect color vision in which color characteristics of a target color are to be inputted, identified matched, and processed in such way as to expose a visual deficiency from the user of the target color then alternate color(s) is/are selected from a color database, chart/table based upon color characteristics of the target color to be matched, then subsequently processed and visually displayed thus enabling comparison of the alternate color(s) with the target color; using gamma correction, color thresholding, alpha composing, color opacity ratios and eye color accuracy test from a patient; and, a desired alternate color is selected and a calculation determined thereof.

Further, the target color may be superimposed within a stereoscopic image to highlight the target color that has been matched to enable comparison with the target color; and selecting the desired alternate color and determining from the color accuracy calculation further comprising displaying the target color superimposed or alpha composed/blended within target image data of stereoscopic photographic subject matter that matches the color that cannot be seen correctly displayed in such a way as to represent a stereoscopic viewing angle, in order to assist the patient with selecting the best match.

DETAILED DESCRIPTION OF THE PREFERRED EMBODIMENTS

A stereoscopic method for highlighting variations of color includes using a camera for taking color pictures; using a computer equipped with a color monitor, and providing a computer-implemented, web-based graphical user interface for inputting target color characteristics and matching image data of stereoscopic photographic subject matter of an object that contains a color that cannot be seen correctly.

The stereoscopic method is useful for highlighting colors that a patient is deficient in as seen through the real world in pictures rather than just for color by itself, most particularly on a color video monitor. The term, "video monitor" includes computers, cell phones, tablets, smart TVs, smart watches, and all internet connected devices that have color video. The stereoscopic method for highlighting the variation of colors may also be useful in health care, pharmaceutical, technological, industrial, forensic science, and architectural settings, including medical equipment, technological equipment, buildings equipment, machinery, transportation structures, or color coating compositions applied over wood or cementitious substrate surfaces, and the like.

EQUATION STEREOSCOPIC=$(a=x*y/2$ and $w=a+1$ and Rectangle=2D $((v=a+1)*10))$:
Alpha=$\propto$:
$\propto$=EQUATION STEREOSCOPIC:
$d(ax)/dx=\propto$:
$\propto$=Output: //where $\propto$=constant. Output is the stereo highlighted image.
The algorithm is iterating the derivate of a through the image pixels to create the output.

Figure 1:
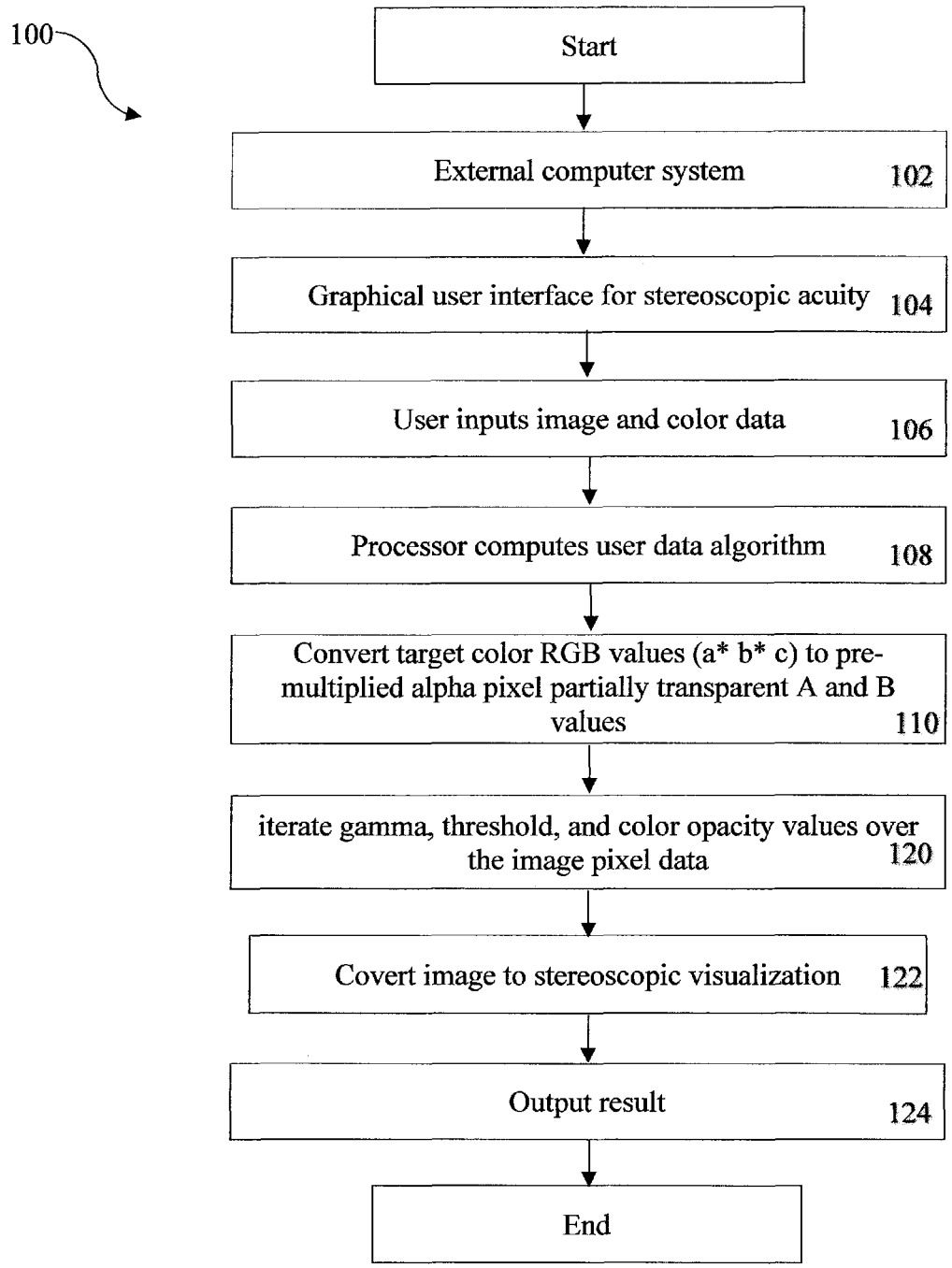
FIG. 1 is a flow chart representation of stereoscopic method for highlighting variations of color in accordance with present invention.

With reference to FIG. 1, a flow diagram 1 illustrates an embodiment of the present invention, in step 102, the user uses a computing device such as a computer or web enabled mobile device (computing device 200). In step 104, the user accesses the graphical user web-based interface for stereoscopic acuity from the computing device to highlight all colors of an individual color in photo data for binocular vision. In step 106, the user inputs image and color data into a user data algorithm. In step 108, the user's data is computed by the algorithm and is executed by the computing device, the algorithm includes computation ##Alpha to perform and calculate the stereoscopic method for highlighting the variation of colors for photographic subject matter. In step 110, the alpha composing color characteristics, RGB values $(a*b*c)$ of the ##Alpha calculation is composed of stereoscopic subject matter described with pre-multiplied alpha RGB components that represent the emission of the object or pixel, and the alpha represents the occlusion. The over operator then becomes $C_0=C_a+C_b(1-\alpha_a)$ and $\alpha_0=\alpha_a+\alpha_b(1-\alpha_a)$. The over operator is a derivative of the Painter's algorithm which is an algorithm for visible surface determination in 3D computer graphics that works on a polygon-by-polygon basis rather than a pixel-by-pixel. The painter's algorithm creates images by sorting the polygons within the image by their depth and placing each polygon in order from the farthest to the closest object. Alpha composing one color over another is the process of combining one color with a background to create the appearance of partial or full transparency with another color. In step 120, the gamma correction value is used to correct the brightness differences between the way a camera device captures content and the way a display screen displays content. The threshold value is used to eliminate noise in the image processing, which allows greater image recognition and color accuracy. The color opacity value is used to control the opacity of the color alpha applied to the target image. Once the gamma, threshold, and color opacity values are inputted; they are iterated within the pixels of the subject image matter. In step 122, after all values are inputted and calculated by the algorithmic process, the target color is highlighted after being chosen from the color table and the stereoscopic visualization is outputted to the user in step 124.

Figure 2:
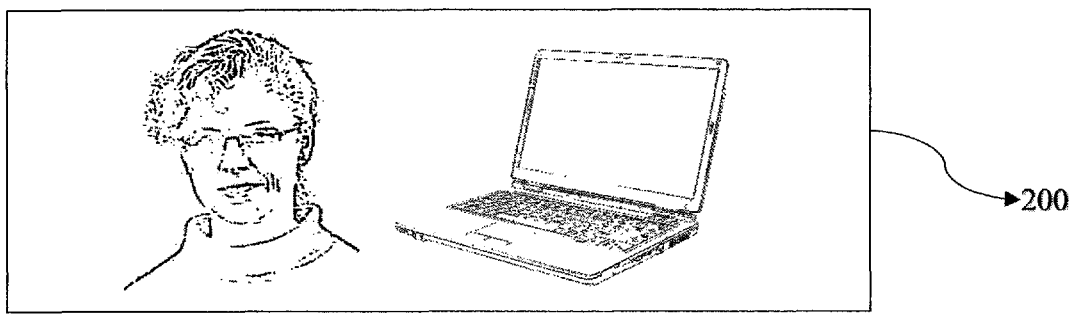
FIG. 2 is a schematic diagram illustrating a patient using a computing device to access a stereoscopic mathematical algorithm in accordance with the present invention.

With reference to FIG. 2, when a patient/user first accesses the algorithm, they upload an image. Upload means to transfer information from one device to another. Patients/users often upload their images from a camera or smartphone to the computing device 200, and then subsequently upload the images from the computing device to a hard drive for storage and backup purposes. Uploading of information can be achieved by various methods depending on the hardware capabilities of your equipment. Wired uploading can be achieved using your camera and computer's USB interfaces. Alternatively, if your hardware has either Bluetooth or built-in Wi-Fi then information can be transferred wirelessly between compatible systems. Modern cameras have high megapixel capabilities and can upload images wirelessly to a smartphone, which can in turn upload them to the stereoscopic color highlighting algorithm.

Figures 3, 4:
FIG. 3 is a first example of creating a stereoscopic image from a single image in accordance with the present invention.
FIG. 4 is a second example of highlighting the colors of the single image in a stereo image from a single image in accordance with the present invention.

FIG. 3 is a first example of creating a stereoscopic image from one image taken at a single angle.

FIG. 4 is the highlighting of the colors from that same image on the stereo side of the image when colors are detected and displaying the output.

Figure 5:
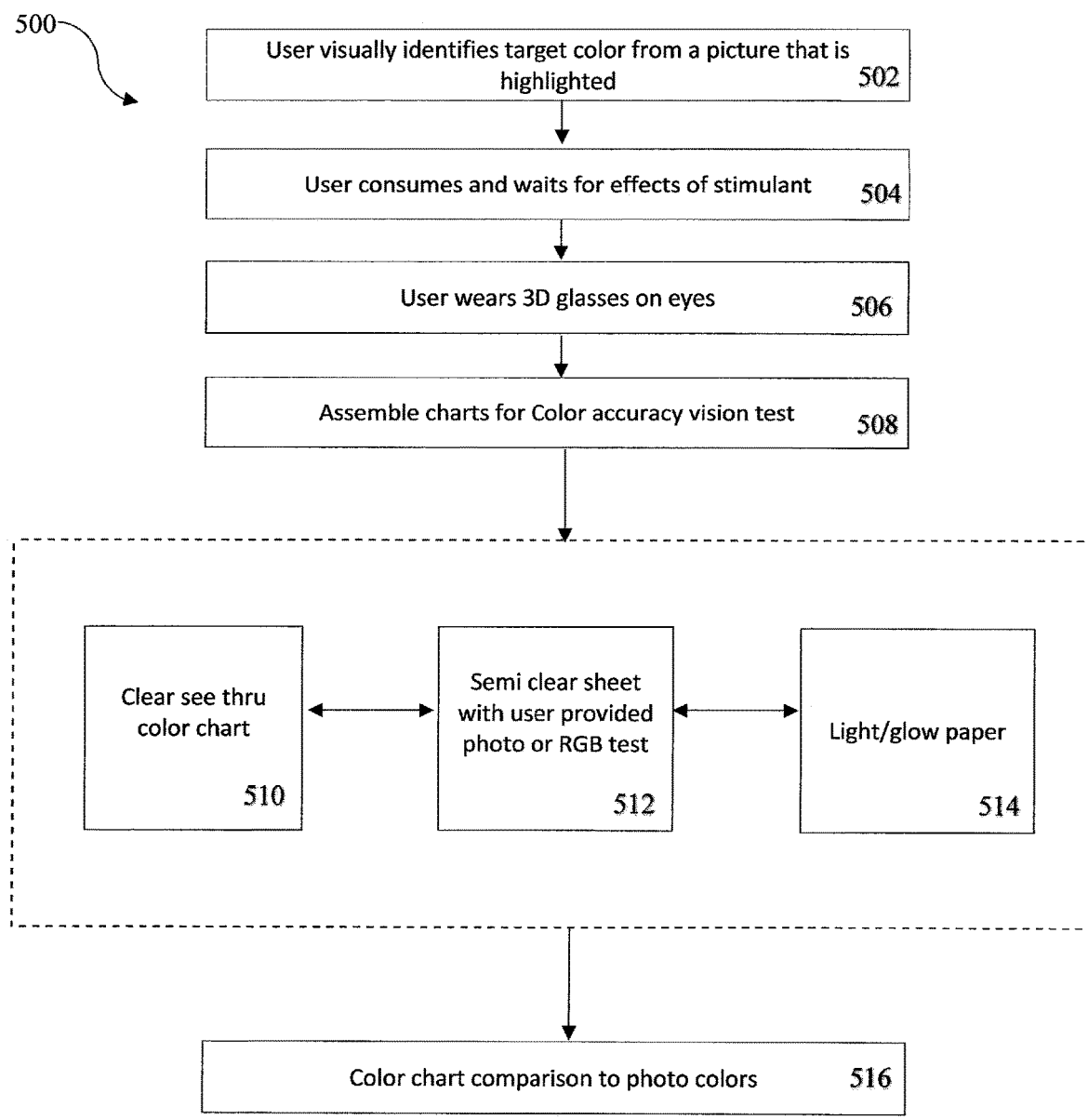
FIG. 5 is a flow chart representation of the elements of the color accuracy test in accordance with the present invention.

FIG. 5 is a flow diagram 2 is an embodiment of the present invention which illustrates the elements of the color accuracy test; in step 502, the user visually identifies target color from a picture that is highlighted from the stereoscopic color accuracy algorithm. in step 504, the user consumes and waits for effects of stimulant included with the color accuracy test. In step 506, the user wears 3D glasses on eyes to view stereoscopic images. In step 508, the user assembles the included charts for the color accuracy vision test. In step 510, a clear see thru color chart. In step 512, a semi clear sheet with user provided photo or RGB test. In step 514, Light/glow paper. Steps 510, 512, and 514 can be arranged in any order. Step 512 and 514 can be modified to be one chart and steps 510, 512 and 514 can be modified to one or more or less charts depending on the user's vision needs. In step 516, The user does a color comparison from the targeted highlighted colors to photo colors.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A computer-implemented, web-based graphical user interface method for measuring color accuracy with stereoscopic three-dimensional visualization, comprising the steps:
   inputting and processing image data of stereoscopic photographic subject matter by custom size with target color characteristics to enable a visual display of said target color;
   identifying the color characteristics of a target color to be highlighted wherein image data of stereoscopic photographic subject matter of an object of scene that contains said color that cannot be seen correctly; and
   selecting from a color database, an alternate color, or a plurality of alternate colors, said selection made based upon color characteristics of said target color to be matched.

2. The method of claim 1, further comprising the step of:
   processing and visually displaying said image data of stereoscopic photographic subject matter with at least one of alternate color, plurality of alternate colors, using gamma correction, thresholding, or segmenting of target image with stereoscopic visualization opacity values of color are identified visually by highlighting the color with alpha blending at a plurality of viewing angles and said target color that has been matched to enable comparison with said target color.

3. The method of claim 1, further comprising the step of:
   displaying the target color alpha blended over target image data of stereoscopic photographic subject matter to enable comparison with said target color;
   selecting a desired alternate color; and
   calculating the displayed target color superimposed or alpha blended within a stereoscopic image for an eye color accuracy vision test.

\* \* \* \* \*